(12) United States Patent
Sugamata

(10) Patent No.: US 10,861,082 B2
(45) Date of Patent: Dec. 8, 2020

(54) MEDIUM AND SYSTEM FOR PRINTER COLOR MATERIAL PURCHASING

(71) Applicant: BROTHER KOGYO KABUSHIKI KAISHA, Nagoya (JP)

(72) Inventor: Hiroki Sugamata, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 332 days.

(21) Appl. No.: 15/838,547

(22) Filed: Dec. 12, 2017

(65) Prior Publication Data

US 2018/0182021 A1 Jun. 28, 2018

(30) Foreign Application Priority Data

Dec. 27, 2016 (JP) .................................. 2016-253748

(51) Int. Cl.
*G06Q 30/00* (2012.01)
*G06Q 30/06* (2012.01)
(Continued)

(52) U.S. Cl.
CPC ....... *G06Q 30/0641* (2013.01); *G06Q 10/087* (2013.01); *G06Q 30/0603* (2013.01);
(Continued)

(58) Field of Classification Search
CPC ........... G06Q 30/0641; G06Q 30/0603; G06Q 10/087; H04L 67/04; H04L 67/10; H04L 67/22; H04L 67/306
See application file for complete search history.

(56) References Cited

U.S. PATENT DOCUMENTS

| 2014/0089088 A1* | 3/2014 | Umeda | G06Q 30/0255 705/14.53 |
| 2014/0378112 A1 | 12/2014 | Sugimoto | |

FOREIGN PATENT DOCUMENTS

| JP | 2009-116483 A | 5/2009 |
| JP | 2014-109962 A | 6/2014 |
| JP | 2015-005196 A | 1/2015 |

OTHER PUBLICATIONS https://web.archive.org/web/20150712081908/https://support.hp.com/us-en/document/c03923208 (Year: 2015).*

* cited by examiner

*Primary Examiner* — Matthew E Zimmerman
(74) *Attorney, Agent, or Firm* — Scully, Scott, Murphy & Presser, PC

(57) ABSTRACT

A management server receives, from a terminal device, authentication information of a target user and first relationship information related to a target printer. In response to transmission of the authentication information to a purchase server, the management server receives, from the purchase server, M number of pieces of color-material identification information identifying M number of types of color material that have been previously purchased by the target user. The management server extracts, from among the M number of pieces of color-material identification information, N number of pieces of color-material identification information, identifying N number of types of color material, by using the first relationship information. The management server transmits, to the terminal device, second relationship information for controlling the terminal device to display a screen used for purchasing at least one type of color material from among the N number of types of color material.

14 Claims, 6 Drawing Sheets

(51) Int. Cl.
  *H04L 29/08* (2006.01)
  *G06Q 10/08* (2012.01)
(52) U.S. Cl.
  CPC .............. *H04L 67/04* (2013.01); *H04L 67/10* (2013.01); *H04L 67/22* (2013.01); *H04L 67/306* (2013.01)

FIG. 2

MANUAL TABLE 226

| MODEL NAME | ERROR CODE | MANUAL |
|---|---|---|
| M1 | EC1(BLACK INK ERROR) | MT1 |
| M1 | EC2(WHITE INK ERROR) | MT1 |
| M2 | EC3(NOZZLE-CLOGGED ERROR) | MT2 |
| M2 | EC4(BLACK INK ERROR) | MT3 |
| ⋮ | ⋮ | ⋮ |

PURCHASE HISTORY TABLE 326

USER HISTORY INFORMATION 326a

ACCOUNT INFORMATION AC2

ACCOUNT INFORMATION AC1

| | PURCHASE DATE | MODEL NAME | SERIAL NUMBER | COLOR INFO | INK ITEM NUMBER |
|---|---|---|---|---|---|
| NEW | D1 | M1 | N1 | BLACK | BK1 |
| | D2 | M2 | N2 | BLACK | BK2 |
| | D3 | M1 | N1 | WHITE | WT1 |
| OLD | D4 | M1 | N1 | BLACK | BK3 |

INK TABLE 328

| INK ITEM NUMBER | PRICE |
|---|---|
| BK1 | P1 |
| BK2 | P2 |
| BK3 | P3 |
| ⋮ | ⋮ |

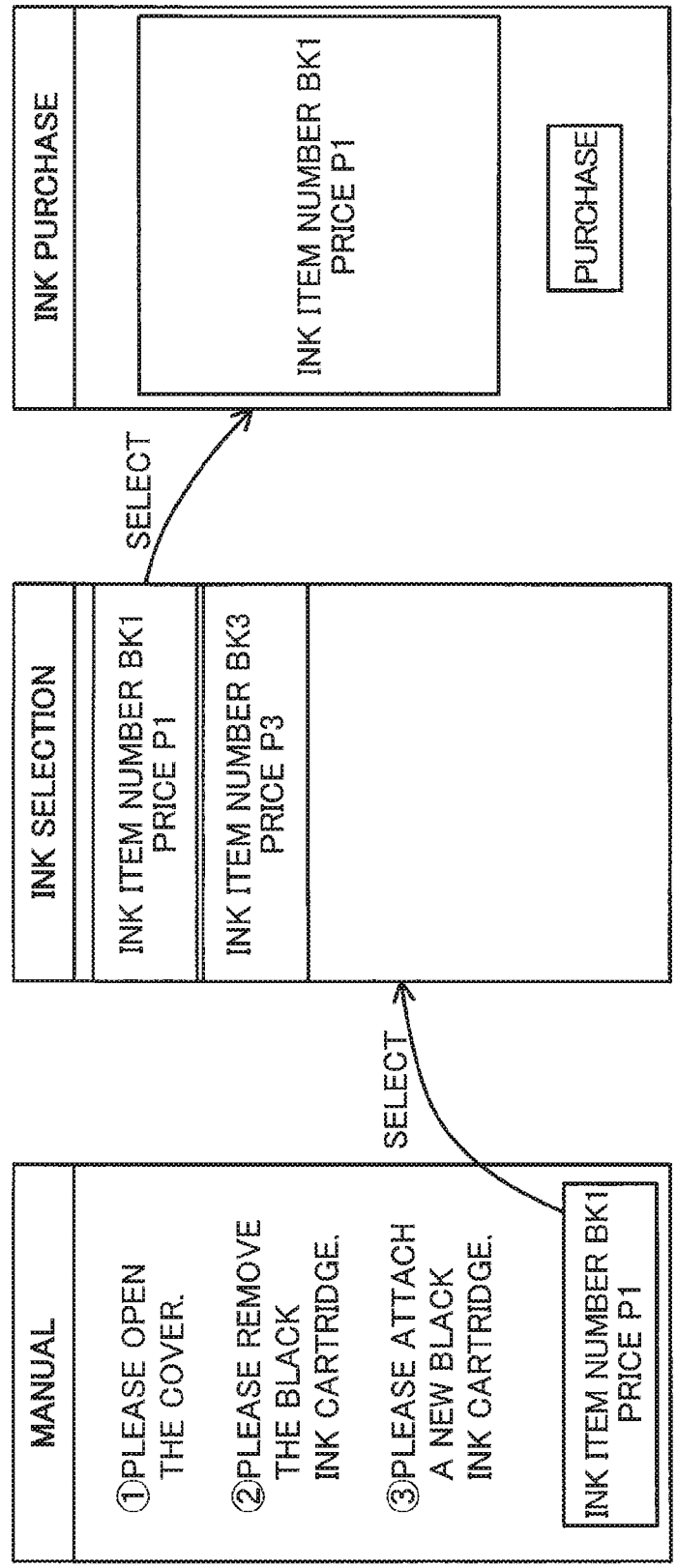

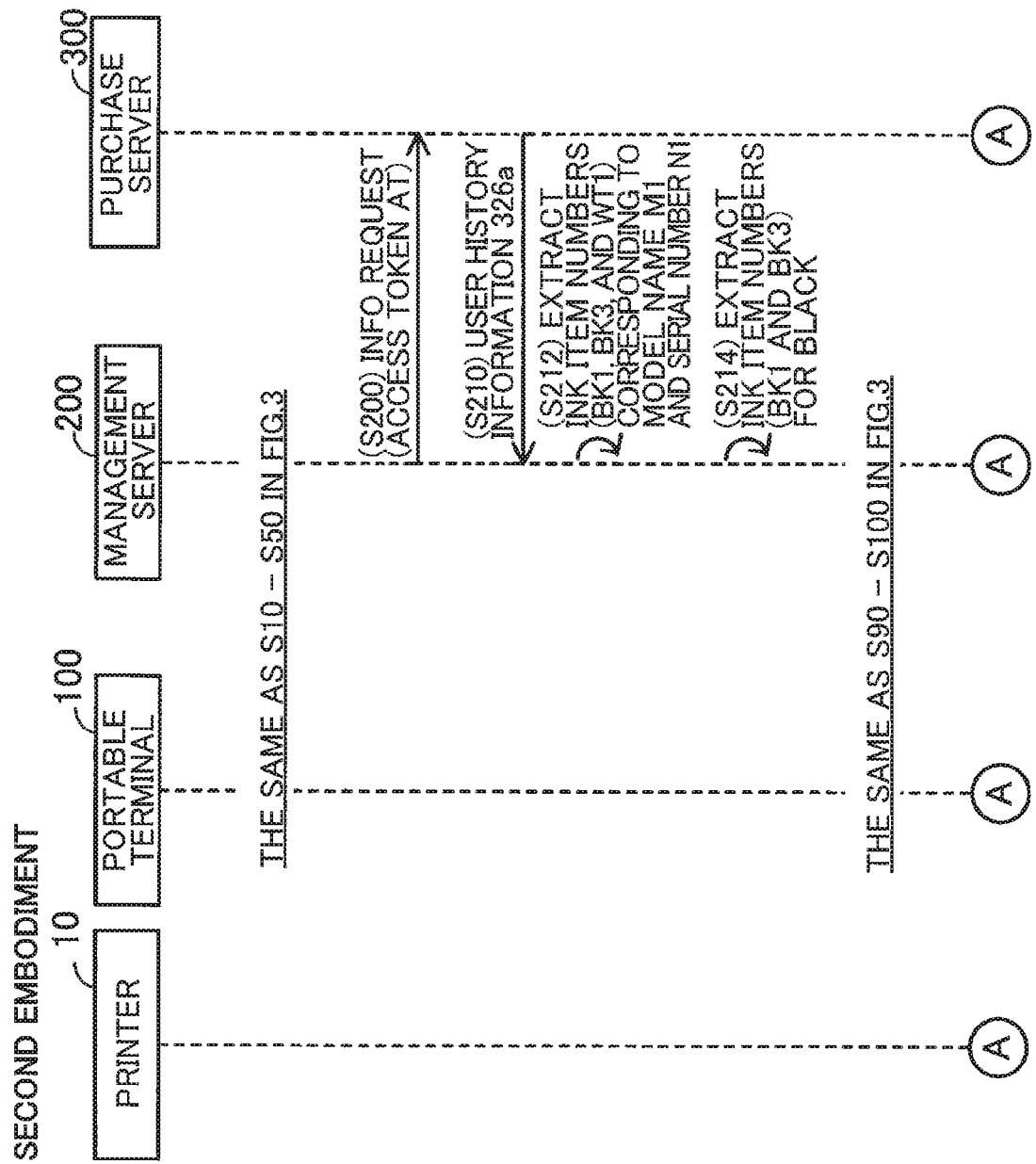

MEDIUM AND SYSTEM FOR PRINTER COLOR MATERIAL PURCHASING

CROSS REFERENCE TO RELATED APPLICATION

This application claims priority from Japanese Patent Application No. 2016-253748 filed Dec. 27, 2016. The entire content of the priority application is incorporated herein by reference.

TECHNICAL FIELD

In this specification, a technique for assisting a user to purchase a color material for printer is disclosed.

BACKGROUND

It is widely known that, when a color material stored in a printer (such as ink or toner) is running short, a user purchases the color material using a purchase server on the Internet.

SUMMARY

For example, a conceivable configuration is that a purchase server stores purchase history data which indicates types of color material that were purchased by a user. A user can view the purchase history, and select a desired color material from the purchase history and purchase the desired color material.

However, when multiple types of color material were purchased by the user and are included in the purchase history, it can be difficult for the user to select an appropriate color material from the purchase history to purchase the appropriate color material.

In this disclosure, a technique by which a user can purchase an appropriate color material is disclosed.

According to one aspect, a non-transitory computer readable storage medium stores instructions for a management server. The instructions, when executed by a computer provided in the management server, cause the computer to perform:

receiving, from a terminal device through the Internet, both of authentication information of a target user and first relationship information related to a target printer, wherein the authentication information of the target user has been registered in a purchase server, and the purchase server is different from the management server;

transmitting the authentication information to the purchase server through the Internet;

receiving M number of pieces of color-material identification information from the purchase server through the Internet, in response to the transmission of the authentication information to the purchase server, wherein each of the M number of pieces of color-material identification information is associated with the authentication information, the M number of pieces of color-material identification information identify M number of types of color material, respectively, the M number of types of color material have been previously purchased by the target user, and M is an integer greater than or equal to two;

extracting, from among the M number of pieces of color-material identification information, N number of pieces of color-material identification information by using the first relationship information, wherein the N number of pieces of color-material identification information identify N number of types of color material, respectively, and N is an integer greater than or equal to one and smaller than M; and transmitting, to the terminal device through the Internet, second relationship information related to the N number of pieces of color-material identification information, wherein the second relationship information is for controlling the terminal device to display a screen used for purchasing at least one type of color material from among the N number of types of color material.

According to another aspect, a management server includes: a network interface; and a controller. The controller is configured to perform:

receiving, via the network interface through the Internet from a terminal device, both of authentication information of a target user and first relationship information related to a target printer, wherein the authentication information of the target user has been registered in a purchase server, and the purchase server is different from the management server;

transmitting the authentication information via the network interface to the purchase server through the Internet;

receiving M number of pieces of color-material identification information from the purchase server through the Internet via the network interface, in response to the transmission of the authentication information to the purchase server, wherein the M number of pieces of color-material identification information are associated with the authentication information and identify M number of types of color material, the M number of types of color material have been previously purchased by the target user, and M is an integer greater than or equal to two;

extracting, from among the M number of pieces of color-material identification information, N number of pieces of color-material identification information by using the first relationship information, wherein the N number of pieces of color-material identification information identify N number of types of color material, and N is an integer greater than or equal to one and smaller than M; and transmitting, to the terminal device through the Internet via the network interface, second relationship information related to the N number of pieces of color-material identification information, wherein the second relationship information is for controlling the terminal device to display a screen used for purchasing at least one type of color material from among the N number of types of color material.

According to another aspect, a non-transitory computer readable storage medium stores instructions for a terminal device. The instructions, when executed by a computer provided in the terminal device, cause the computer to perform:

transmitting, to a management server through the Internet, both of authentication information of a target user and first relationship information related to a target printer, wherein the authentication information of the target user has been registered in a purchase server, and the purchase server is different from the management server, wherein the authentication information is used by the management server to receive, from the purchase server, M number of pieces of color-material identification information, each of the M number of pieces of color-material identification information is associated with the authentication information, the M number of pieces of color-material identification information identify M number of types of color material, respectively, the M number of types of color material have been purchased previously by the target user, and M is an integer greater than or equal to two, and wherein the first relationship information is used by the management server to extract, from among the M number of pieces of color-material identification information, N number of pieces of color-material identification information, the N number of pieces of color-material identification information identify N number of types of color material, respectively, and N is an integer greater than or equal to one and smaller than M;

receiving, in response to the transmission of the authentication information and the first relationship information to the management server, second relationship information related to the N number of pieces of color-material identification information from the management server through the Internet; and controlling a display provided to the terminal device, by using the second relationship information, to display a screen used for purchasing at least one type of color material from among the N number of types of color material.

BRIEF DESCRIPTION OF THE DRAWINGS

The particular features and advantages of the disclosure will become apparent from the following description taken in connection with the accompanying drawings, in which:

FIG. 2 illustrates an example of tables stored in respective servers shown in FIG. 1;

FIG. 5 shows various screens displayed on a portable terminal shown in FIG. 1; and FIG. 6 is a part of a sequence diagram according to a second embodiment and corresponding to FIG. 3.

DETAILED DESCRIPTION

Figure 1:
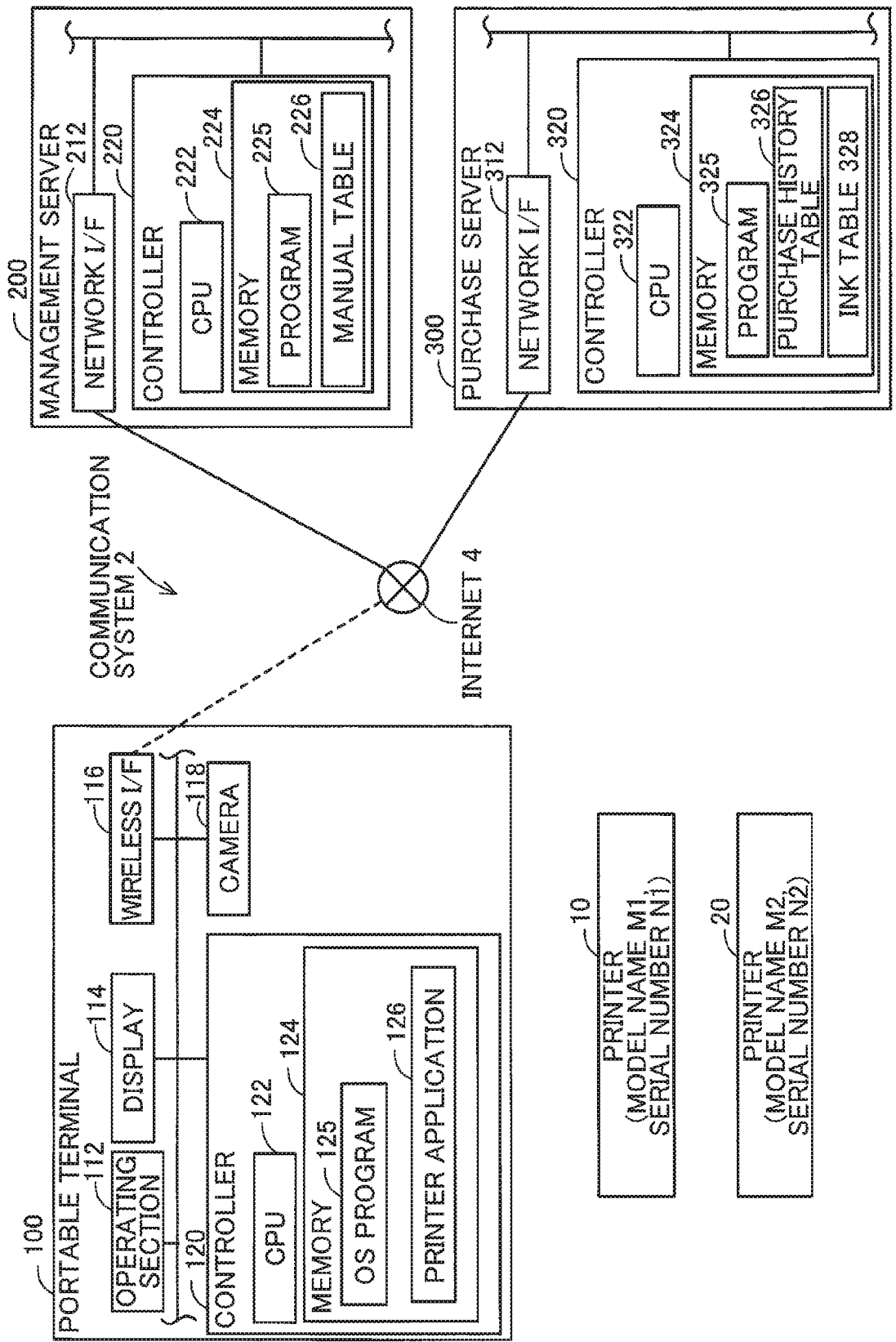
FIG. 1 illustrates a configuration of a communication system according to a first embodiment.

A management server and a terminal device according to a first embodiment will be described while referring to the accompanying drawings wherein like parts and components are designated by the same reference numerals to avoid duplicating description.

First Embodiment (Configuration of Communication System 2)

As illustrated in FIG. 1, a communication system 2 according to a first embodiment includes: a plurality of printers 10 and 20; a portable terminal 100; a management server 200; and a purchase server 300. The portable terminal 100 can be connected to the Internet 4 by using wireless communications conforming to Wi-Fi, 3rd Generation (3G), 4th Generation (4G), or the like. The management server 200 and the purchase server 300 are provided on the Internet 4. The portable terminal 100, the management server 200, and the purchase server 300 can communicate with one another via the Internet 4.

(Configuration of Printers 10 and 20)

The printer 10 has a model name M1 and a serial number N1. The printer 10 is an industrial printer provided with an inkjet printing mechanism. That is, the printer 10 is configured to eject ink droplets onto a special-purpose printing medium, such as plastic, metal, glass, or ceramic, thereby forming an image on the printing medium. In the present embodiment, the printer 10 is configured to accommodate only one ink cartridge which stores ink of a single color. That is, the printer 10 is configured to form a monochromatic image on a printing medium.

The printer 10 can use a wide variety of kinds of ink. For example, the printer 10 can print a black image on a plastic printing medium by using a black ink containing a first type of solvent, and also can print a black image on a metal printing medium by using another black ink containing a second type of solvent. That is, the printer 10 can print images of the same color on different kinds of printing media by using different types of ink that contain different types of solvent. In addition, the printer 10 can print a black image on a plastic printing medium by using a black ink, and can also print a white image on a plastic printing medium by using a white ink. That is, the printer 10 can print images of different colors on the same type of printing medium by using inks of different colors. Thus, a vendor of the printer 10 sells a wide variety of types of ink (for example, 100 or more types of ink) corresponding to various types of solvents and to a plurality of colors.

In a modification, the printer 10 may be configured to accommodate, at the same time, a plurality of ink cartridges which store ink of a plurality of different colors, respectively. That is, the printer 10 may be a color printer which can print multi-color images. On the other hand, the printer 20 is also an industrial printer having the same configuration as that of the printer 10, and has a model name M2 and a serial number N2. Although not illustrated in the figure, the printers 10 and 20 each include an operating section, a display, and a controller, as well as the printing mechanism.

(Configuration of Portable Terminal 100)

The portable terminal 100 is a portable terminal device, such as a portable phone (e.g. smartphone), a personal digital assistant (PDA), a notebook computer, a tablet computer, a portable music player, or a portable video player. The portable terminal 100 includes: an operating section 112; a display 114; a wireless interface 116; a camera 118; and a controller 120. These sections 112 to 120 are connected to a bus (whose symbol is not illustrated). Hereinafter, the word "interface" is abbreviated as "I/F".

The operating section 112 includes a plurality of keys. A user can operate the operating section 112 to input his/her various instructions to the portable terminal 100. The display 114 is configured to display various types of information. The display 114 serves also as a touch panel. In other words, the display 114 serves also as the operating section. The wireless I/F 116 is configured to perform wireless communication conforming to Wi-Fi, 3G, 4G, or the like. The camera 118 has a capturing mechanism for capturing still images and motion images.

The controller 120 includes a CPU 122 and a memory 124. The CPU 122 executes various processes based on an operating system (OS) program 125 stored in the memory 124. The OS program 125 is used to achieve basic operations of the portable terminal 100. The memory 124 stores not only the OS program 125, but also a printer application 126 (hereinafter referred simply to as an "application 126"). The application 126 is used to obtain information from a QR code (registered trademark) captured by the camera 118, and to communicate with the management server 200 by using the obtained information. The application 126 may be installed in the portable terminal 100 from a server which is provided on the Internet by a vendor of the printers 10 and 20. Or otherwise, the application 126 may be installed in the portable terminal 100 from a medium which has been shipped together with the printers 10 and 20.

(Configuration of Management Server 200)

The management server 200 is provided on the Internet 4 by a vendor of the printers 10 and 20. The management server 200 is configured to allow the portable terminal 100 to display a screen according to information obtained from the portable terminal 100 and the purchase server 300. The management server 200 includes a network I/F 212 and a controller 220. The network IF 212 and the controller 220 are connected to a bus (whose symbol is not illustrated). The network I/F 212 is connected to the Internet 4.

The controller 220 includes a CPU 222 and a memory 224. The CPU 222 executes various processes based on a program 225 stored in the memory 224. The memory 224 stores not only the program 225 but also a manual table 226.

As illustrated in FIG. 2, the manual table 226 associates a model name, an error code, and a manual with one another. The model name is a model name of a printer. The error code is a code indicating an error which will possibly occur in the printer. The manual is data indicating how to solve the error. For example, an error code EC1 indicates an ink error, in which an amount of black ink remaining in a printer having the model name M1 (printer 10, for example) has become lower than or equal to a predetermined threshold. An error code EC2 indicates an ink error, in which an amount of white ink remaining in the printer having the model name M1 has become lower than or equal to the predetermined threshold. The predetermined threshold may be zero, or may be a value more than zero. The error codes EC1 and EC2 are associated with the same manual MT1. An error code EC3 indicates a nozzle-clogged error, in which ink ejection nozzles are clogged in a printing mechanism of a printer having the model name M2 (printer 20, for example). Each ink error code includes a character string indicative of which color of ink has been subjected to the ink error. For example, the error code EC1 includes a character string ("BK", for example) indicating black; and the error code EC2 includes another character string ("WT", for example) indicating white.

(Configuration of Purchase Server 300)

The purchase server 300 is configured to provide an electronic commerce service, and is provided on the Internet 4 by a commerce service provider who is different from a vendor of the printers 10 and 20. In a modification, the purchase server 300 may be provided by the vendor of the printers 10 and 20. The purchase server 300 includes a network I/F 312 and a controller 320. The network I/F 312 is connected to the Internet 4.

The controller 320 includes a CPU 322 and a memory 324. The CPU 322 executes various processes based on a program 325 stored in the memory 324. The memory 324 stores not only the program 325 but also a purchase history table 326 and an ink table 328.

As illustrated in FIG. 2, the purchase history table 326 associates a plurality of pieces of account information AC1, AC2, . . . and a plurality of pieces of user history information 326a with one another. The account information, such as AC1, is authentication information used to log in the purchase server 300, and has been registered by a user in the purchase server 300 in advance. The user history information 326a indicates a purchase history of a user identified by the account information, such as AC1. The user history information 326a associates, with one another: a purchase date on which the user purchased an ink cartridge; a model name and a serial number of a printer, for which the user purchased the ink cartridge; color information of the ink cartridge; and an ink item number of the ink cartridge. The ink item number indicates an item number of the ink cartridge. The color information indicates a color of ink stored in the ink cartridge.

The ink table 328 associates a plurality of ink item numbers with corresponding prices. Each price indicates a current price of an ink cartridge identified by the corresponding ink item number. The memory 324 further stores therein data of a plurality of web pages in association with the plurality of ink item numbers stored in the ink table 328. Each web page is designed to allow a user to purchase an ink cartridge identified by a corresponding ink item number with its current price stored in the ink table 328.

(Processes Performed by the Devices 10, 100, 200, and 300; See FIGS. 3 and 4)

Next will be described, with reference to FIGS. 3 and 4, processes that is performed by the devices 10, 100, 200, and 300 when a user is to purchase an ink cartridge by using the purchase server 300 in response to an occurrence of an ink error in the printer 10. It is noted that in order to promote easy understanding of the processes executed by the CPUs 122, 222, and 322 of the devices 100, 200, and 300 based on the programs 126, 225, and 325, respectively, it will be described such that those processes are performed by the corresponding devices (such as the portable terminal 100), rather than by the CPUs (such as the CPU 122). In addition, because all the communications described below are performed via the Internet 4, the phrase "via the Internet 4" will be omitted from the descriptions below for simplification.

In S10, the printer 10 displays a notification screen which contains both of a QR code and a message indicating that an ink error (a black ink error, for example) has occurred. The QR code is information, in which are encoded: the model name M1 of the printer 10; the serial number N1 of the printer 10; and the error code EC1 indicating a black-ink error, in this example. The printer 10 is configured such that when a user attaches an ink cartridge to the printer 10, the printer 10 receives input by the user of information indicating color of ink stored in the ink cartridge (black, in this example). With this configuration, when the ink error occurs, the printer 10 displays the QR code by using the error code EC1 indicating the black-ink error. In a modification, the ink cartridge may be provided with a memory storing color information indicative of color of ink stored in the ink cartridge. In this case, the printer 10 may read the color information from the memory, and display the QR code by using an error code indicative of an ink error of ink in color indicated by the color information. As another example, in a case where the printer 10 is configured to accommodate a plurality of ink cartridges for a plurality of colors at the same time, the printer 10 may be configured to store information associating each accommodation section for accommodating an ink cartridge with color of ink stored in the ink cartridge. In this case, the printer 10 identifies color that is associated with an accommodation section accommodating an ink cartridge in which an ink error has occurred, and displays a QR code by using an ink error code of the identified color.

Viewing the notification screen displayed in S10, a user knows occurrence of the ink error. Accordingly, in S20, the user operates the operating section 112 of the portable terminal 100 to start the application 126, and performs a login operation including inputting of the user's account information AC1 for logging in the purchase server 300. As a result, in S22, the portable terminal 100 sends a login request via the wireless I/F 116 to the purchase server 300. The login request contains the inputted account information AC1.

Upon receiving the login request from the portable terminal 100 in S22, in S30, the purchase server 300 performs authentication of the account information AC1 contained in the login request. When the account information AC1 has already been registered in the memory 324, that is, when the authentication has succeeded, in S32 the purchase server 300 creates an access token AT and registers the access token AT in association with the account information AC1 in the memory 324. As a result, the access token AT is associated with the user history information 326a for the account information AC1 stored in the purchase history table 326. In S34, the purchase server 300 sends, to the portable terminal 100, a login success notification containing the created access token AT.

Upon receiving the login success notification from the purchase server 300 via the wireless I/F 116 in S34, the portable terminal 100 stores, in the memory 124, the access token AT contained in the login success notification. As a result, the portable terminal 100 becomes capable of using the access token AT in subsequent processes.

In S40, the user performs a reading operation to read the QR code, which has been displayed on the printer 10 in S10. The user performs the reading operation by using the camera 118 of the portable terminal 100. In S42, the portable terminal 100 decodes the QR code captured by the camera 118, thereby acquiring the model name M1, the serial number N1, and the error code EC1. In S50, the portable terminal 100 sends a page data request via the wireless I/F 116 to the management server 200. The page data request contains: the acquired information (that is, the model name M1, the serial number N1, and the error code EC1); and the registered information (that is, access token AT).

Upon receiving the page data request from the portable terminal 100 in S50, in S60, the management server 200 sends an ink information request to the purchase server 300. The ink information request contains: the model name M1; the serial number N1; and the access token AT, all of which are contained in the page data request.

Upon receiving the ink information request from the management server 200 in S60, the purchase server 300 obtains, from the purchase history table 326, the user history information 326a associated with the access token AT contained in the ink information request. The purchase server 300 then obtains, from the user history information 326a, those ink item numbers and color information that are associated with the model name M1 and the serial number N1 that are contained in the ink information request. That is, the purchase server 300 obtains a plurality of pieces of ink information (that is, a plurality of combinations of: ink item number and color information) indicative of a plurality of ink cartridges that were purchased by the user in the past for the printer 10 identified by the model name M1 and the serial number N1. The purchase server 300 arranges the plurality of pieces of ink information in a manner that the order of the purchases of the ink cartridges can be identified. In this example, a piece of ink information (BK1 and black) corresponding to a purchase date D1 is arranged at the head of the arrangement; a piece of ink information (WT1 and white) corresponding to a purchase date D3 is arranged at the next; and a piece of ink information (BK3 and black) corresponding to a purchase date D4 is arranged at the last of the arrangement. In S70, the purchase server 300 sends, to the management server 200, the pieces of ink information that are arranged in the manner that the order of the purchases of the ink cartridges can be identified. It is noted that the purchase server 300 does not send, to the management server 200, a piece of ink information (BK2 and black) that has been registered in the user history information 326a as indicative of an ink cartridge purchased by the user for the printer 20 that is identified by the model name M2 and the serial number N2, which are different from the model name M1 and the serial number N1 (which will be referred to as "a piece of ink information for another printer" hereinafter).

In S70, the management server 200 receives the plurality of pieces of ink information from the purchase server 300. It is noted that the management server 200 receives the pieces of ink information for the printer 10, but does not receive ink information for the other printer. This is because the purchase server 300 does not send the ink information for the other printer to the management server 200. In addition, the management server 200 can identify the order of the purchases of the ink cartridges because the pieces of ink information are arranged such that the order of the purchase of the ink cartridges can be identified. Next, in S80, the management server 200 determines that a black-ink error has occurred, based on the character string (BK, in this example) contained in the error code EC1 of the page data request received in S50. The management server 200 extracts, from the pieces of ink information received, two ink item numbers (that is, BK1 and BK3) corresponding to the determined color, that is, black. In S90, the management server 200 sends a detailed-information request to the purchase server 300. The detailed-information request contains the access token AT and the extracted two ink item numbers (that is, BK1 and BK3).

Upon receiving the detailed-information request from the management server 200 in S90, the purchase server 300 obtains, from the ink table 328, prices P1 and P3 that are respectively associated with the ink item numbers BK1 and BK3 that are contained in the detailed-information request. The purchase server 300 also obtains a URL (which stands for uniform resource locator) "U1" of a web page which is designed to allow a user to purchase, at the price P1, an ink cartridge identified by the ink item number BK1. The purchase server 300 also obtains a URL "U2" of a web page that is designed to allow a user to purchase, at the price P3, an ink cartridge identified by the ink item number BK3. Each of the URLs "U1" and "U2" indicates the location inside the purchase server 300 (more specifically, the location inside the memory 324), in which data of the corresponding web page is stored. In S100, the purchase server 300 sends detailed-information to the management server 200. The detailed-information contains: information in which the ink item number BK1, the price P1, and the URL "U1" are associated with one another; and information in which the ink item number BK3, the price P3, and the URL "U2" are associated with one another.

Figure 3:
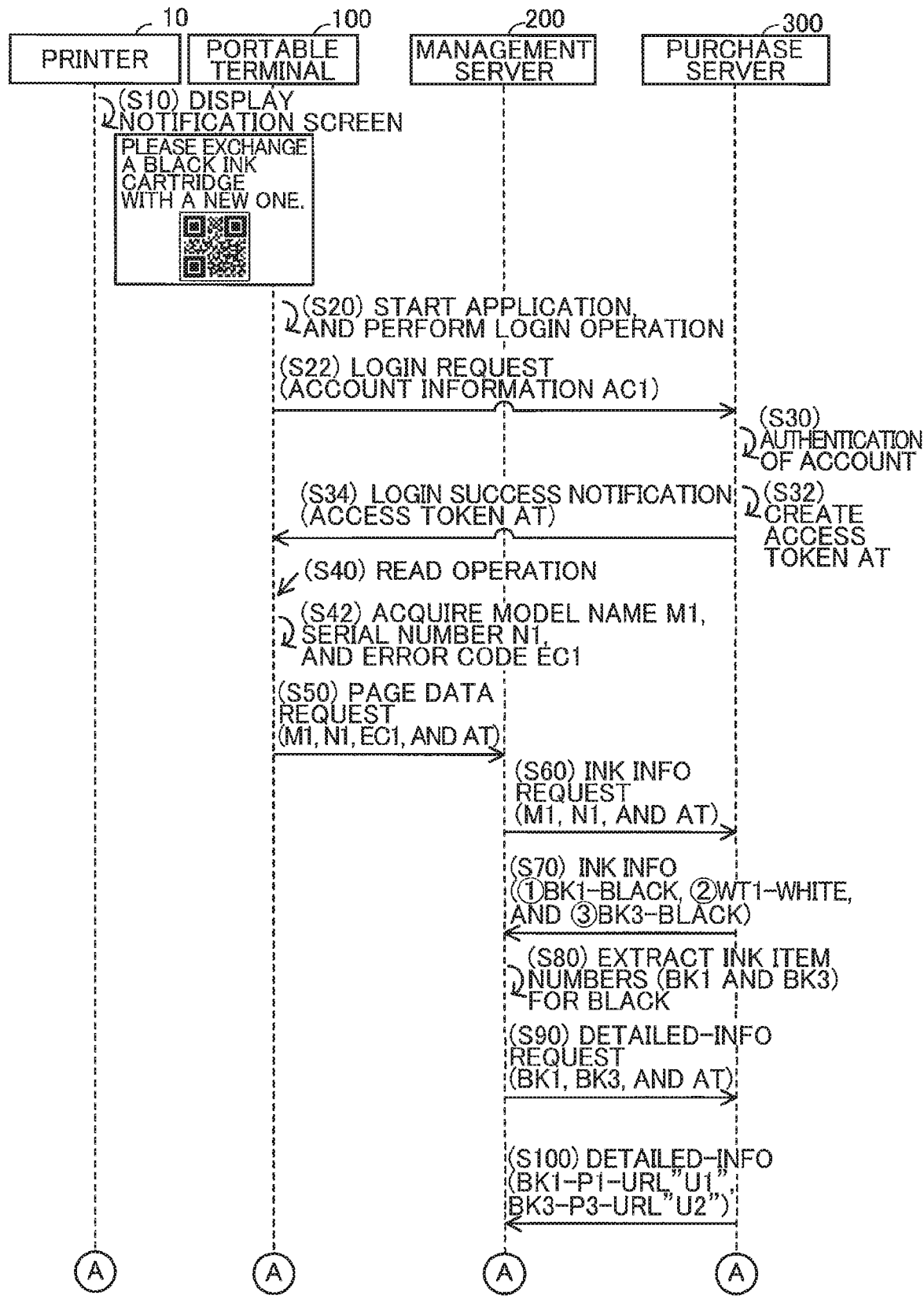
FIG. 3 is a part of a sequence diagram according to the first embodiment.
Figure 4:
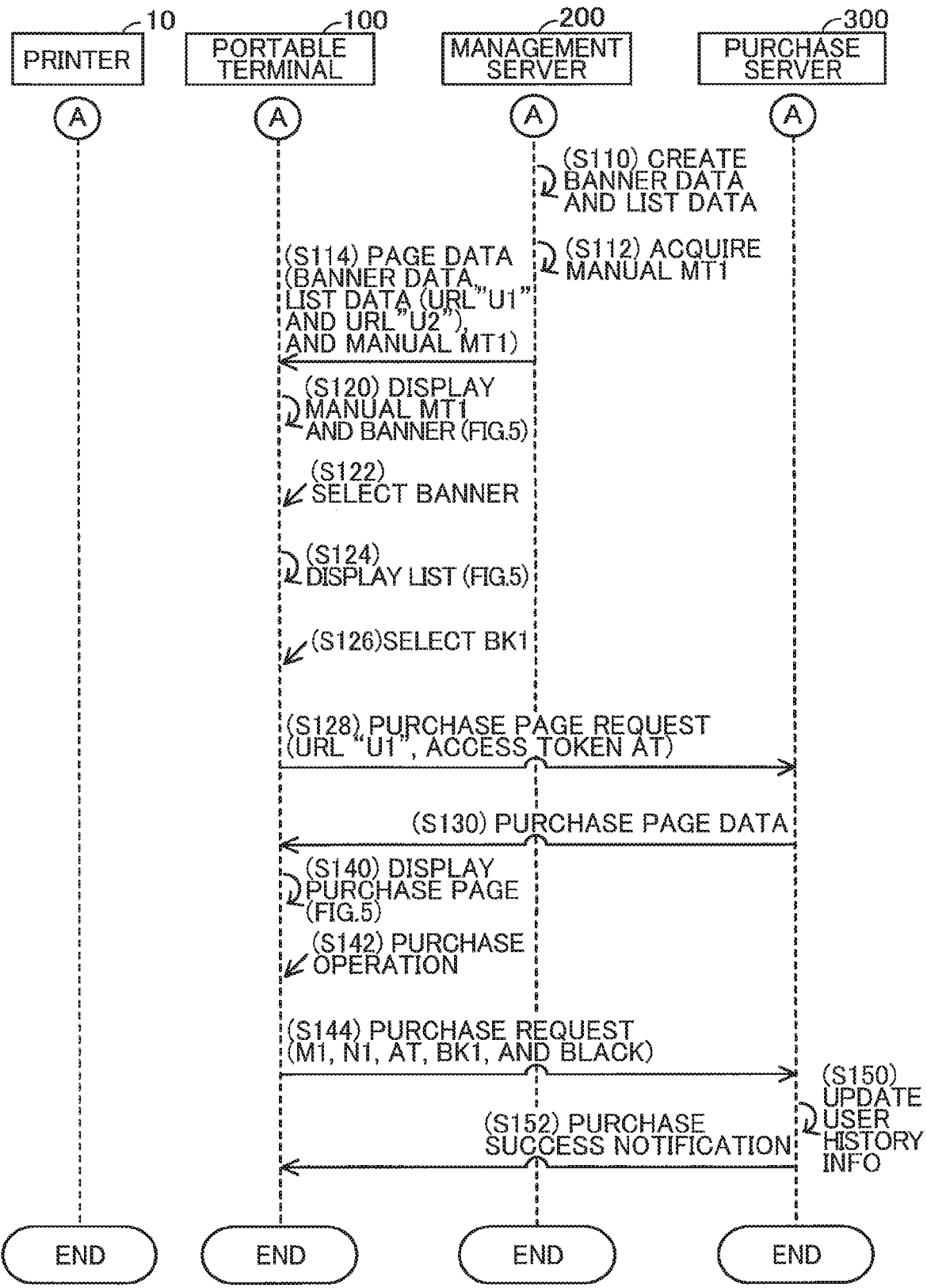
FIG. 4 is a remaining part of the sequence diagram according to the first embodiment.

Upon receiving the detailed-information from the purchase server 300 in S100, the management server 200 creates banner data and list data in S110 of FIG. 4. The banner data represents a banner to be displayed as being superimposed on a manual in a screen. The banner data contains: an ink item number BK1, which is associated with the most recent purchase date among the two ink item numbers extracted in S80 of FIG. 3; and the price P1 that is contained in the detailed-information received in S100 in association with the ink item number BK1. The list data represents a list to be used to select an ink cartridge. The list data contains, for each of the two ink item numbers extracted in S80: the ink item number; and the price that corresponds to the ink item number and is contained in the detailed-information received in S100. In addition, for each of the two ink item numbers extracted in S80, the list data associates the ink item number with the corresponding URL which is contained in the detailed-information received in S100. In S112, the management server 200 acquires, from the manual table 226, the manual MT1 that is associated with the model name M1 and the error code EC1 received in S50 of FIG. 3. In S114, the management server 200 sends page data to the portable terminal 100. The page data contains: the created banner data and list data; and the acquired manual MT1.

Upon receiving the page data from the management server 200 via the wireless I/F 116 in S114, in S120, the portable terminal 100 causes the display 114 to display the manual MT1 contained in the page data. In addition, the portable terminal 100 causes the display 114 to display the banner represented by the banner data such that the banner is superimposed on the manual MT1 in the screen. As a result, a screen shown in the left side of FIG. 5 is displayed, and a user can find a way to solve the black-ink error. By viewing the banner, the user knows the ink item number BK1 and the price P1 of a black-ink cartridge that the user purchased most recently among the plurality of ink cartridges the user purchased for the printer 10 in the past.

If a user desires to purchase the ink cartridge, the user selects the banner in S122. Next, in S124, the portable terminal 100 causes the display 114 to display a list in accordance with the list data contained in the page data received in S114. As a result, a screen shown in the middle of FIG. 5 is displayed. Thus, the user can find the ink item number and price of each of the two black-ink cartridges which the user purchased for the printer 10 in the past. In the case of FIG. 4, the user selects the ink item number BK1 from the list in S126. As a result, the portable terminal 100 identifies the URL "U1" that is associated with the selected ink item number BK1 in the list data that is contained in the page data received in S114. Then, in S128, the portable terminal 100 sends a purchase page request, containing the access token AT, via the wireless I/F 116 to the purchase server 300 by setting the URL "U1" as a destination of the transmission.

Upon receiving the purchase page request from the portable terminal 100 in S128, the purchase server 300 first performs authentication of the access token AT contained in the purchase page request. When the access token AT has already been registered in the memory 324, that is, when the authentication has been succeeded, in S130 the purchase server 300 sends purchase page data to the portable terminal 100. The purchase page data represents a web page indicated by the URL "U1" contained in the purchase page request.

Upon receiving the purchase page data from the purchase server 300 via the wireless I/F 116 in S130, in S140 the portable terminal 100 causes the display 114 to display the purchase page represented by the purchase page data. As a result, a screen on the right side of FIG. 5 is displayed. In S142, the user performs a purchase operation to select a purchase button in the purchase page. As a result, in S144, the portable terminal 100 sends a purchase request via the wireless I/F 116 to the purchase server 300. The purchase request contains: the information that the portable terminal 100 has sent in S50 of FIG. 3 (that is, the model name M1, the serial number N1, and the access token AT); the ink item number BK1 of an ink cartridge desired to be purchased; and the color information "black" indicating the color of ink stored in the ink cartridge to be purchased.

Upon receiving the purchase request from the portable terminal 100 in S144, the purchase server 300 performs: a charging process for the ink cartridge identified by the ink item number BK1; and a dispatching process to dispatch the ink cartridge. Information (such as credit card number, name, and address) used in both of the charging process and the dispatching process may have been registered in advance in the purchase server 300 in association with the account information AC1, or may be received together with the purchase request by the purchase server 300 in S144. In S150, the purchase server 300 updates the user history information 326a (see FIG. 2) associated with the access token AT contained in the purchase request. Specifically, the purchase server 300 adds, to the user history information 326a, new data, in which: the date (today) when this order was executed; and the model name M1, the serial number N1, the color information, and the ink item number BK1, all of which were included in the purchase request, are associated with one another. In S152, the purchase server 300 sends a purchase success notification to the portable terminal 100. As a result, the processes to purchase an ink cartridge are completed.

Advantageous Effect of First Embodiment

As described above, the printer 10 can use a wide variety of types of ink in the present embodiment. Assume a comparative configuration, in which the management server 200 does not extract the black-ink item numbers BK1 and BK3 in S80 of FIG. 3, and causes the portable terminal 100 to display a list including ink item numbers identifying all the ink cartridges that were purchased by the user of the printer 10 in the past. In such a case, the list can include a large number of ink item numbers. It will become difficult for the user to appropriately select a desired ink item number to purchase the corresponding ink cartridge. Contrarily, according to the present embodiment, when a black-ink error occurs in the printer 10, the management server 200 receives the access token AT and the error code EC1 from the portable terminal 100 (S50 of FIG. 3). The management server 200 sends the access token AT to the purchase server 300 (S60). The management server 200 receives, from the purchase server 300, the three ink item numbers BK1, WT1, and BK3 identifying the three ink cartridges that were purchased by the user for the printer 10 in the past (S70). The management server 200 uses the error code EC1 to extract, from the three ink item numbers BK1, WT1, and BK3, two ink item numbers BK1 and BK3 identifying two types of black ink (S80). The management server 200 sends the page data including the two ink item numbers BK1 and BK3 to the portable terminal 100 (S114 of FIG. 4). As a result, the portable terminal 100 displays a screen (middle screen in FIG. 5) indicating a list of the two ink item numbers BK1 and BK3 (S124). Consequently, the user does not have to select his/her desired ink item number from all the three ink item numbers BK1, WT1, and BK3. By viewing the list, the user can appropriately select the desired ink item number (BK1) and purchase a corresponding ink cartridge.

In response to sending the access token AT and the error code EC1 to the management server 200 (S50 of FIG. 3), the portable terminal 100 receives, from the management server 200, page data including the two ink item numbers BK1 and BK3 identifying the two types of black-ink cartridge (S114 of FIG. 4). The portable terminal 100 then displays the screen (middle screen in FIG. 5) indicating the list of the two ink item numbers BK1 and BK3 (S124). Consequently, the user does not have to select a desired ink item number from all the three ink item numbers BK1, WT1, and BK3. By viewing the list, the user can appropriately select the desired ink item number (BK1) and purchase a corresponding ink cartridge.

(Correspondence)

The access token AT is one example of "authentication information." EC1 is one example of "first relationship information" and "color-material information." The page data sent in S114 of FIG. 4 is one example of "second relationship information." The three ink item numbers BK1, BK3, and WT1 sent in S70 of FIG. 3 are one example of "M number of pieces of color-material identification information." The two ink item numbers BK1 and BK3 extracted in S80 of FIG. 3 are one example of "N number of pieces of color-material identification information." The banner and the list displayed in S120 and S124 are one example of a "screen used for purchasing at least one type of color material from among the N types of color material." The serial number N1 is one example of "target-printer identification information." The two price information P1 and P3 contained in the detailed-information transmitted in S100 are one example of "N pieces of price information". The two URLs "U1" and "U2" contained in the detailed-information transmitted in S100 are an example of "N pieces of location information". The camera 118 is an example of a "first interface". The wireless I/F 116 is an example of a "second interface".

Second Embodiment; See FIG. 6

Next will be described a second embodiment. In the process of the second embodiment, only those processes that are different from those in the first embodiment will be described. In the present embodiment, processes of FIG. 6 are performed instead of the processes of FIG. 3. Processes S10 to S50 in FIG. 6 are the same as the processes S10 to S50 in FIG. 3. In S200, the management server 200 sends an information request to the purchase server 300. The information request contains the access token AT that has been contained in the page data request received in S50. The information request is different from the ink information request of S60 in FIG. 3 in that the information request does not include the model name M1 or the serial number N1.

Upon receiving the information request from the management server 200 in S200, the purchase server 300 obtains, from the purchase history table 326, user history information 326a associated with the access token AT contained in the information request. The purchase server 300 sends the obtained user history information 326a to the management server 200 in S210.

In S210, the management server 200 receives the user history information 326a from the purchase server 300. That is, the management server 200 receives not only the ink item numbers, BK1, WT1, and BK3, of those ink cartridges that were purchased for the printer 10 identified by the model name M1 and the serial number N1, but also the ink item number BK2 of an ink cartridge that was purchased for the printer 20 which is different from the printer 10. In S212, the management server 200 extracts, from all the ink item numbers BK1, BK2, WT1, and BK3 contained in the user history information 326a, three ink item numbers BK1, BK3, and WT1 that are associated with the model name M1 and the serial number N1 that are contained in the page data request received in S50. Next, in S214, the management server 200 extracts, from the extracted three ink item numbers BK1, BK3, and WT1, two ink item numbers BK1 and BK3 corresponding to black that is indicated by the error code EC1 contained in the page data request received in S50. Processes S90 to S100 in FIG. 6 are the same as the processes S90 to S100 in FIG. 3. After the processes S90 to S100 in FIG. 6 are executed, the processes of FIG. 4 are performed, as is in the first embodiment.

Advantageous Effect of Second Embodiment

In the present embodiment, a user does not have to select a desired ink item number from all the ink item numbers BK1, BK2, WT1, and BK3 contained in the user history information 326a. By viewing the list, the user can appropriately select the desired ink item number (BK1) and purchase a corresponding ink cartridge. Also, in the present embodiment, the management server 200 extracts, from the user history information 326a, the ink item numbers BK1, WT1, and BK3 of ink cartridges purchased for the printer 10 (S212). The purchase server 300 does not have to extract the ink item numbers BK1, WT1, and BK3. Processing load on the purchase server 300 can be reduced.

(Correspondence)

In the present embodiment, the four ink item numbers BK1, BK2, WT1, and BK3 of the user history information 326a are one example of "M number of pieces of color-material identification information." The three ink item numbers BK1, BK3, and WT1, which are associated with the model name M1 and the serial number N1 in the user history information 326a, are one example of "K number of pieces of color-material identification information." The one ink item number BK2, which is associated with the model name M2 and the serial number N2 in the user history information 326a, is one example of "(M-K) number of pieces of color-material identification information."

While the description has been made in detail with reference to specific embodiments thereof, it would be apparent to those skilled in the art that various changes and modifications may be made therein without departing from the spirit and scope of the above described aspects.

(Modification 1)

For example, processes S22 to S34 of FIG. 3 may be omitted. In this case, in each of the processes of S50, S60, S90, and S128 and S144 of FIG. 4, the account information AC1 is transmitted, instead of the access token AT. In the present modification, the account information AC1 is one example of the "authentication information."

(Modification 2)

In S50 of FIG. 6 in the second embodiment (that is, S50 of FIG. 3), the error code EC1 may not be sent to the management server 200. In this case, although the process S212 of FIG. 6 is performed, the process S214 is not performed. As a result, the portable terminal 100 displays a list which includes not only the ink item numbers BK1 and BK3 for black ink but also the ink item number WT1 for white ink. In the present modification, the "first relationship information" may not include the "color-material information", and thus the serial number N1 used in S212 is one example of the "first relationship information." In addition, the three ink item numbers BK1, WT1, and BK3 extracted in S212 are one example of the "N pieces of color-material identification information."

(Modification 3)

In S50 of FIG. 6 in the second embodiment (that is, S50 of FIG. 3), the model name M1 or the serial number N1 may not be sent to the management server 200. In this case, the process S212 of FIG. 6 is not performed, and the three ink item numbers BK1, BK2, and BK3 for black ink are extracted in S214. As a result, the portable terminal 100 displays a list including not only the ink item numbers BK1 and BK3 of black-ink cartridges purchased for the printer 10, but also the ink item number BK2 of a black-ink cartridge purchased for the printer 20 which is different from the printer 10. In the present modification, the "first relationship information" may not include the "target-printer identification information", and thus the error code EC1 used in S214 is one example of the "first relationship information." In addition, the three ink item numbers BK1, BK2, and BK3 extracted in S214 are one example of the "N pieces of color-material identification information."

(Modification 4)

In the second embodiment, the management server 200 may perform the process S214 of FIG. 6 to extract three ink item numbers BK1, BK2, and BK3, and thereafter perform the process S212 of FIG. 6 to extract two ink item numbers BK1 and BK3.

(Modification 5)

In S70 of FIG. 3, the management server 200 may receive, from the purchase server 300, such ink information that further includes three pieces of price information, including the prices P1 and P3, in correspondence with the three ink item numbers BK1, WT1, and BK3. Alternatively, the management server 200 may receive the ink table 328, as a whole, from the purchase server 300. Generally speaking, a "receiving N number of pieces of price information from the purchase server via the Internet" has only to receive at least N pieces of price information from the purchase server 300.

(Modification 6)

In S70 of FIG. 3, the management server 200 may receive, from the purchase server 300, such ink information that further includes three URLs, including the URLs "U1" and "U2", in correspondence with the three ink item numbers BK1, WT1, and BK3. That is, the "receiving N number of pieces of location information from the purchase server via the Internet" may receive at least N pieces of location information from the purchase server 300.

(Modification 7)

The processes S90 and S100 in FIG. 3 may be omitted. In this case, in S114 of FIG. 4, the page data does not include the price information or the URLs. That is, the "receiving N number of pieces of price information from the purchase server via the Internet", the "receiving N number of pieces of location information from the purchase server via the Internet", the "transmitting the N number of pieces of color-material identification information to the purchase server via the Internet", and the "transmitting the N number of pieces of color-material identification information to the purchase server via the Internet" may be omitted.

(Modification 8)

Instead of reading the QR code with the camera 118, the portable terminal 100 may receive error information, which includes the model name M1, the serial number N1, and the error code EC1, via the wireless I/F 116 from the printer 10. In the present modification, the "first interface" is the same component as the "second interface."

(Modification 9)

The printer 10 may be configured to display the model name M1, the serial number N1, and the error code EC1 when an ink error occurs. After viewing the displayed information, a user may operate the operating section 112 of the portable terminal 100 to input the model name M1, the serial number N1, and the error code EC1 to the portable terminal 100. Even with this configuration, the portable terminal 100 can obtain the model name M1, the serial number N1, and the error code EC1. In the present modification, an "acquiring the first relationship information from the target printer" may be omitted.

(Modification 10)

The management server 200 may not perform the process S112 of FIG. 4, and may send, to the portable terminal 100, such page data that does not include the manual MT1 in S114. In the present modification, the portable terminal 100 first displays only the banner, and then displays the list. In another modification, the management server 200 may not create the list data in S110 of FIG. 4, and may send, to the portable terminal 100, such page data that includes no list data in S114. In this modification, the portable terminal 100 first displays a screen of the manual containing the banner, and displays the purchase page when the banner is selected. In this modification, the banner data is one example of the "second relationship information." In still another modification, in the case where the management server 200 extracts only one ink item number in S80 of FIG. 3, the management server 200 may create no list data, and may send, to the portable terminal 100, such page data that includes no list data. Also in this case, the portable terminal 100 first displays a screen of the manual containing the banner, and displays the purchase page when the banner is selected. Also in this modification, the banner data is one example of the "second relationship information."

(Modification 11)

Printers are not limited to the industrial printers 10 and 20, but may be home-use printers, or multi-function peripherals having not only a print function but also other functions (such as a scan function and a facsimile function).

(Modification 12)

The processes in FIGS. 3, 4, and 6 are achieved by the CPUs 122, 222, and 322 of the devices 100, 200, and 300 executing programs (i.e. software). Alternatively, at least one of the processes in FIGS. 3, 4, and 6 may be executed by hardware (such as a logic circuit).

What is claimed is:

1. A communication system, comprising a management server, a purchase server different from the management server, and a terminal device,
    the terminal device comprising:
    a terminal controller; and
    a terminal network interface,
    the terminal controller being configured to perform:
    decoding a QR code including data about a target printer; and
    transmitting, via the terminal network interface through the Internet to the management server, both of authentication information of a target user and first relationship information related to the target printer, wherein the authentication information of the target user has been registered in the purchase server, wherein the first relationship information is based on information acquired from the decoded QR code;
    the management server comprising:
    a server controller; and
    a server network interface,
    the server controller being configured to perform:
    receiving, via the server network interface through the Internet from the terminal device, both of the authentication information and the first relationship information;
    transmitting the authentication information via the network interface to the purchase server through the Internet;
    receiving M number of pieces of color-material identification information from the purchase server through the Internet via the network interface, in response to the transmission of the authentication information to the purchase server, wherein the M number of pieces of color-material identification information are associated with the authentication information and identify M number of types of color material, the M number of types of color material have been previously purchased by the target user, and M is an integer greater than or equal to two;

extracting, from among the M number of pieces of color-material identification information, N number of pieces of color-material identification information by using the first relationship information, wherein the N number of pieces of color-material identification information identify N number of types of color material, and N is an integer greater than or equal to one and smaller than M; and transmitting, to the terminal device through the Internet via the network interface, second relationship information related to the N number of pieces of color-material identification information, the terminal controller being configured to further perform:

receiving the second relationship information from the management server via the terminal network interface through the Internet; and controlling a display provided to the terminal device, by using the second relationship information, to display a screen used for purchasing at least one type of color material from among the N number of types of color material.

2. The communication system according to claim 1, wherein the server controller is configured to further perform receiving N number of pieces of location information from the purchase server through the Internet, wherein the N number of pieces of location information indicate locations of N number of screens in the purchase server, respectively, wherein the N number of screens are used for purchasing the N number of types of color material identified by the N number of pieces of color-material identification information, respectively, and wherein the second relationship information includes both of the N number of pieces of color-material identification information and the N number of pieces of location information.

3. The communication system according to claim 2, wherein the server controller is configured to further perform transmitting the N number of pieces of color-material identification information to the purchase server through the Internet, after having extracted the N number of pieces of color-material identification information from the M number of pieces of color-material identification information, and wherein the N number of pieces of location information are received from the purchase server, in response to the transmission of the N number of pieces of color-material identification information to the purchase server.

4. The communication system according to claim 1, wherein the first relationship information includes color-material related information related to color material of a specific color, wherein the color material of the specific color is accommodated in the target printer with its currently-remaining amount being smaller than or equal to a prescribed threshold value, wherein the server controller extracts the N number of pieces of color-material identification information, by using the color-material related information included in the first relationship information, from among the M number of pieces of color-material identification information, and wherein the N number of pieces of color-material identification information identify the N number of types of color material of the specific color, respectively.

5. The communication system according to claim 4, wherein the first relationship information further includes target-printer identification information identifying the target printer, wherein the server controller transmits both of the authentication information and the target-printer identification information to the purchase server through the Internet, wherein the purchase server stores therein a purchase history information, wherein the purchase history information is associated with the authentication information, wherein the purchase history information includes both of the M number of pieces of color-material identification information and at least one piece of color-material identification information, wherein each of the M number of pieces of color-material identification information is associated with the target-printer identification information, wherein the M number of pieces of color-material identification information indicate the M number of types of color material, respectively, wherein the M number of types of color material have been previously purchased by the target user for the target printer, wherein the at least one piece of color-material identification information is associated with other printer identification information indicative of at least one printer other than the target printer and indicates at least one type of color material, wherein the at least one type of color material has been previously purchased by the target user for the at least one printer, and wherein in response to the transmission of the authentication information and the target-printer identification information to the purchase server, the management server receives the M number of pieces of color-material identification information associated with the target-printer identification information from the purchase server through the Internet via the network interface, but does not receive the at least one piece of color-material identification information associated with the other printer identification information from the purchase server through the Internet via the network interface.

6. The communication system according to claim 4, wherein the first relationship information further includes target-printer identification information identifying the target printer, wherein the purchase server stores a purchase history information, wherein the purchase history information is associated with the authentication information, and includes the M number of pieces of color-material identification information, wherein the M number of pieces of color-material identification information include K number of pieces of color-material identification information and (M-K) number of pieces of color-material identification information,

17 wherein K is an integer greater than or equal to one and smaller than M, wherein each of the K number of pieces of color-material identification information is associated with the target-printer identification information, wherein the K number of pieces of color-material identification information indicate K number of types of color material, respectively, wherein the K number of types of color material have been previously purchased by the target user for the target printer, wherein each of the (M-K) number of pieces of color-material identification information is associated with other printer identification information indicative of at least one printer other than the target printer, wherein the (M-K) number of pieces of color-material identification information indicate (M-K) number of color material, respectively, wherein the (M-K) number of color material have been previously purchased by the target user for the at least one printer other than the target printer, wherein in response to the transmission of the authentication information to the purchase server, the server controller receives the M number of pieces of color-material identification information, the target-printer identification information, and the other printer identification information from the purchase server through the Internet via the network interface, wherein, by using both of the target-printer identification information and the color-material related information, the server controller extracts the N number of pieces of color-material identification information for the specific color from among the K number of pieces of color-material identification information within the M number of pieces of color-material identification information, and wherein both of the target-printer identification information and the color-material related information are included in the first relationship information.

7. The communication system according to claim 1, wherein the server controller is configured to further perform receiving N number of pieces of price information from the purchase server through the Internet via the network interface, wherein the N number of pieces of price information indicate prices of the N number of types of color material identified by the N number of pieces of color-material identification information, and wherein the second relationship information includes both of the N number of pieces of color-material identification information and the N number of pieces of price information.

8. The communication system according to claim 7, wherein the server controller is configured to further perform transmitting the N number of pieces of color-material identification information to the purchase server through the Internet via the network interface, after having extracted the N number of pieces of color-material identification information from the M number of pieces of color-material identification information, and wherein the server controller receives the N number of pieces of price information from the purchase server via the network interface, in response to the transmission of the N number of pieces of color-material identification information to the purchase server.

18

9. A non-transitory computer readable storage medium storing instructions for a terminal device, the instructions, when executed by a computer provided in the terminal device, causing the computer to perform:

decoding a QR code including data about a target printer;

transmitting, to a management server through the Internet, both of authentication information of a target user and first relationship information related to the target printer, wherein the authentication information of the target user has been registered in a purchase server, and the purchase server is different from the management server, wherein the first relationship information is based on information acquired from the decoded QR code, wherein the authentication information is used by the management server to receive, from the purchase server, M number of pieces of color-material identification information, each of the M number of pieces of color-material identification information is associated with the authentication information, the M number of pieces of color-material identification information identify M number of types of color material, respectively, the M number of types of color material have been purchased previously by the target user, and M is an integer greater than or equal to two, and wherein the first relationship information is used by the management server to extract, from among the M number of pieces of color-material identification information, N number of pieces of color-material identification information, the N number of pieces of color-material identification information identify N number of types of color material, respectively, and N is an integer greater than or equal to one and smaller than M;

receiving, in response to the transmission of the authentication information and the first relationship information to the management server, second relationship information related to the N number of pieces of color-material identification information from the management server through the Internet; and controlling a display provided to the terminal device, by using the second relationship information, to display a screen used for purchasing at least one type of color material from among the N number of types of color material.

10. The non-transitory computer readable storage medium according to claim 9, wherein the first relationship information includes color-material related information related to color material of a specific color, wherein the color material of the specific color is accommodated in the target printer with its currently-remaining amount being smaller than or equal to a prescribed threshold value, wherein the color-material related information included in the first relationship information is used by the management server to extract the N number of pieces of color-material identification information from among the M number of pieces of color-material identification information, and wherein the N number of pieces of color-material identification information identify the N number of types of color material of the specific color, respectively.

11. The non-transitory computer readable storage medium according to claim 10, wherein the first relationship information further includes target-printer identification information identifying the target printer, wherein in response to the transmission of the authentication information and the first relationship information to the management server, the second relationship information related to the N number of pieces of color-material identification information is received from the management server through the Internet, wherein the N number of pieces of color-material identification information identify the N number of types of color material of the specific color, respectively, and wherein the N number of types of color material have been previously purchased by the target user for the target printer.

12. The non-transitory computer readable storage medium according to claim 10, wherein the instructions, when executed by the computer, cause the computer to further perform acquiring the QR code displayed by the target printer via a first interface provided to the terminal device, and wherein the authentication information and the first relationship information are transmitted to the management server via a second interface provided to the terminal device.

13. The non-transitory computer readable storage medium according to claim 12, wherein the first interface is a camera, and the second interface is different from the first interface and is configured to perform a wireless communication.

14. The non-transitory computer readable storage medium according to claim 9, wherein the second relationship information includes both of the N number of pieces of color-material identification information and N number of pieces of price information indicative of prices of the N number of types of color material identified by the N number of pieces of color-material identification information.

* * * * *